United States Patent
Zhou et al.

(10) Patent No.: US 12,041,616 B2
(45) Date of Patent: Jul. 16, 2024

(54) CARRIER SWITCHING RESTRICTION RULES FOR UPLINK CONTROL INFORMATION

(71) Applicant: QUALCOMM Incorporated, San Diego, CA (US)

(72) Inventors: Yan Zhou, San Diego, CA (US); Konstantinos Dimou, San Francisco, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 264 days.

(21) Appl. No.: 17/524,611

(22) Filed: Nov. 11, 2021

(65) Prior Publication Data

US 2022/0150884 A1    May 12, 2022

Related U.S. Application Data

(60) Provisional application No. 63/112,610, filed on Nov. 11, 2020.

(51) Int. Cl.
*H04W 72/21* (2023.01)
*H04W 72/0453* (2023.01)
*H04W 72/56* (2023.01)

(52) U.S. Cl.
CPC ........... *H04W 72/21* (2023.01); *H04W 72/56* (2023.01); *H04W 72/0453* (2013.01)

(58) Field of Classification Search
CPC . H04W 72/21; H04W 72/232; H04W 72/046; H04W 72/56; H04W 72/0453; H04L 5/0044; H04L 5/0062; H04L 5/0053; H04L 5/0023; H04B 7/0695
See application file for complete search history.

(56) References Cited

U.S. PATENT DOCUMENTS

| | | | | |
|---|---|---|---|---|
| 11,431,455 B2* | 8/2022 | Sun | ...... | H04L 5/0048 |
| 11,626,952 B2* | 4/2023 | Zhang | ...... | H04W 72/0453 |
| | | | | 370/329 |
| 11,641,231 B2* | 5/2023 | Xiao | ...... | H04L 5/0048 |
| | | | | 375/267 |
| 11,653,275 B2* | 5/2023 | Bae | ...... | H04L 5/0023 |
| | | | | 370/331 |
| 11,671,220 B2* | 6/2023 | Sun | ...... | H04W 72/21 |
| | | | | 370/329 |
| 11,785,601 B2* | 10/2023 | Jung | ...... | H04W 72/23 |
| | | | | 370/329 |
| 11,882,571 B2* | 1/2024 | Bae | ...... | H04L 5/0092 |

(Continued)

*Primary Examiner* — Brian T O Connor
(74) *Attorney, Agent, or Firm* — Holland & Hart LLP

(57) ABSTRACT

Methods, systems, and devices for wireless communications are described. A user equipment (UE) may identify uplink control information to be transmitted using a first carrier of a carrier group associated with a cell group. The UE may select a second carrier of the carrier group to transmit the uplink control information based at least in part on a type of uplink control information to be transmitted, a priority level associated with the uplink control information, a timing for transmission of the uplink control information with respect to an associated downlink transmission, or a combination thereof. The UE may transmit the uplink control information to one or more cells in the cell group using the second carrier.

20 Claims, 10 Drawing Sheets

(56) References Cited

U.S. PATENT DOCUMENTS

| | | | |
|---|---|---|---|
| 2022/0116172 A1* | 4/2022 | Tang | H04L 5/0098 |
| 2022/0248345 A1* | 8/2022 | Nangia | H04W 52/146 |
| 2023/0291442 A1* | 9/2023 | Davoli | H04B 7/0628 |
| | | | 375/224 |

* cited by examiner

CARRIER SWITCHING RESTRICTION RULES FOR UPLINK CONTROL INFORMATION

CROSS REFERENCE

The present application for patent claims the benefit of U.S. Provisional Patent Application No. 63/112,610 by ZHOU et al., entitled "CARRIER SWITCHING RESTRICTION RULES FOR UPLINK CONTROL INFORMATION," filed Nov. 11, 2020, assigned to the assignee hereof, and expressly incorporated by reference herein.

FIELD OF TECHNOLOGY

The following relates to wireless communications, including carrier switching restriction rules for uplink control information.

BACKGROUND

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support carrier switching restriction rules for uplink control information (UCI). Generally, the described techniques provide various mechanisms that support wireless communications in a wireless network. Broadly, aspects of the described techniques support various mechanisms to improve care selection and/or reselection for UCI. For example, a user equipment (UE) may be configured with a cell group, which includes multiple component carriers (CCs) (e.g., a carrier group). The UE may perform physical uplink control channel (PUCCH) CC switching based on a carrier selection (CS) rule. The CS rule may be based on the type of UCI (e.g., feedback information, scheduling request (SR), channel state information (CSI) reporting, etc.), a priority level of the UCI, and/or based on the timing of feedback with regard to a corresponding physical downlink shared channel (PDSCH) transmission. Broadly, the UE may select a CC among the CC group for its UCI transmission according to the CS rule. For example, the UE may select from a subset of CCs within the carrier group based on the UCI being associated with different types of UCI. The UE may select CCs in one frequency range (FR) for some UCI types/priorities and another FR for other UCI types/priorities. The UE may select CCs in one FR or another FR based on hybrid automatic repeat/request acknowledgement (HARQ-ACK) feedback timing. Accordingly, the described techniques provide various mechanisms that improve carrier selection for UCI transmissions within the cell group.

A method for wireless communication at a UE is described. The method may include identifying UCI to be transmitted using a first carrier of a carrier group associated with a cell group, performing, based on a carrier selection rule, a carrier selection from the first carrier to a second carrier of the carrier group to transmit the UCI, the carrier selection rule based on a type of UCI to be transmitted, a priority level associated with the UCI, a timing for transmission of the UCI with respect to an associated downlink transmission, or a combination thereof, and transmitting the UCI to one or more cells in the cell group using the second carrier.

An apparatus for wireless communication at a UE is described. The apparatus may include a processor, memory in electronic communication with the processor, and instructions stored in the memory. The instructions may be executable by the processor to cause the apparatus to identify UCI to be transmitted using a first carrier of a carrier group associated with a cell group, perform, based on a carrier selection rule, a carrier selection from the first carrier to a second carrier of the carrier group to transmit the UCI, the carrier selection rule based on a type of UCI to be transmitted, a priority level associated with the UCI, a timing for transmission of the UCI with respect to an associated downlink transmission, or a combination thereof, and transmit the UCI to one or more cells in the cell group using the second carrier.

Another apparatus for wireless communication at a UE is described. The apparatus may include means for identifying UCI to be transmitted using a first carrier of a carrier group associated with a cell group, means for performing, based on a carrier selection rule, a carrier selection from the first carrier to a second carrier of the carrier group to transmit the UCI, the carrier selection rule based on a type of UCI to be transmitted, a priority level associated with the UCI, a timing for transmission of the UCI with respect to an associated downlink transmission, or a combination thereof, and means for transmitting the UCI to one or more cells in the cell group using the second carrier.

A non-transitory computer-readable medium storing code for wireless communication at a UE is described. The code may include instructions executable by a processor to identify UCI to be transmitted using a first carrier of a carrier group associated with a cell group, perform, based on a carrier selection rule, a carrier selection from the first carrier to a second carrier of the carrier group to transmit the UCI, the carrier selection rule based on a type of UCI to be transmitted, a priority level associated with the UCI, a timing for transmission of the UCI with respect to an associated downlink transmission, or a combination thereof, and transmit the UCI to one or more cells in the cell group using the second carrier.

Some examples of the method, apparatuses, and non-transitory computer-readable medium described herein may further include operations, features, means, or instructions for identifying, based on the carrier selection rule, a subset of carriers in the carrier group available for transmitting the UCI, the subset of carriers including at least the second carrier.

Some examples of the method, apparatuses, and non-transitory computer-readable medium described herein may further include operations, features, means, or instructions for prioritizing one or more carriers in the subset of carriers based on the type of UCI to be transmitted and selecting the second carrier from the subset of carriers based on the prioritizing.

Some examples of the method, apparatuses, and non-transitory computer-readable medium described herein may further include operations, features, means, or instructions for receiving a signal indicating the subset of carriers, the signal including at least one of a radio resource control (RRC) signal, a medium access control (MAC) control element (CE), a downlink control information (DCI), or a combination thereof.

Some examples of the method, apparatuses, and non-transitory computer-readable medium described herein may further include operations, features, means, or instructions for determining that the type of UCI includes an uplink feedback message associated with the downlink transmission and selecting the second carrier from the carrier group based on the uplink feedback message.

Some examples of the method, apparatuses, and non-transitory computer-readable medium described herein may further include operations, features, means, or instructions for determining that the type of UCI includes a scheduling request, a channel state information (CSI) report, or both and selecting the second carrier from a subset of carriers in the carrier group based on the scheduling request, the CSI report, or both.

DETAILED DESCRIPTION

Some wireless communication systems may allow a user equipment (UE) to perform carrier switching (e.g., carrier switching/selection) for the UE to transmit uplink control information (UCI) over a physical uplink control channel (PUCCH). For example, multiple component carriers (CCs) (e.g., a carrier group) may be configured with PUCCH resources within a cell group. For example, the UE can feed back hybrid automatic repeat/request acknowledgement (HARQ-ACK) information using the earliest PUCCH resource to reduce feedback latency. However, this rule may be overly limiting for the UE and/or may not address other types of UCI information, different UCI priority levels, and the like. In some aspects, this rule may negatively impact the timing of UCI transmissions, which may result in violation of latency requirements for the UCI transmission. Accordingly, improved rules for CC selection for UCI transmission within a cell group may be needed.

Aspects of the disclosure are initially described in the context of wireless communication systems. Generally, the described techniques provide various mechanisms that support wireless communications in a wireless network. Broadly, aspects of the described techniques support various mechanisms to improve care selection and/or reselection for UCI. For example, a UE may be configured with a cell group, which includes multiple CCs (e.g., a carrier group). The UE may perform PUCCH CC switching based on a carrier selection (CS) rule. The CS rule may be based on the type of UCI (e.g., feedback information, scheduling request (SR), channel state information (CSI) report, etc.), a priority level of the UCI, and/or based on the timing of feedback with regard to a corresponding physical downlink shared channel (PDSCH) transmission. Broadly, the UE may select a CC among the CC group for its UCI transmission according to the CS rule. For example, the UE may select from a subset of CCs within the carrier group based on the UCI being associated with different types of UCI. The UE may select CCs in one frequency range (FR) for some UCI types/priorities and another FR for other UCI types/priorities. The UE may select CCs in one FR or another FR based on hybrid automatic repeat/request acknowledgement (HARQ-ACK) feedback timing. Accordingly, the described techniques provide various mechanisms that improve carrier selection for UCI transmissions within the cell group.

Aspects of the disclosure are further illustrated by and described with reference to apparatus diagrams, system diagrams, and flowcharts that relate to carrier switching restriction rules for UCI.

Figure 1:
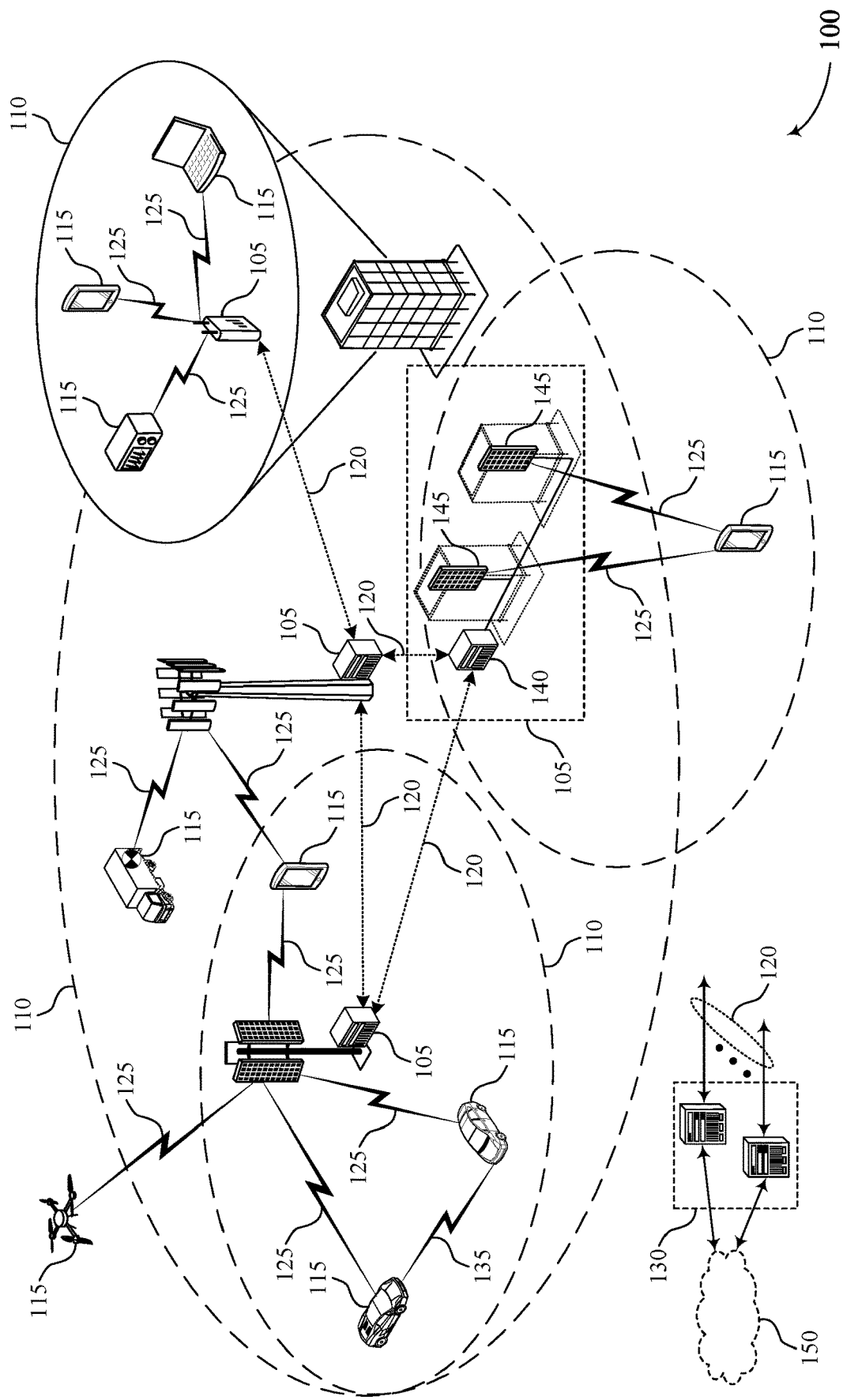
FIG. 1 illustrates an example of a wireless communication system that supports carrier switching restriction rules for uplink control information (UCI) in accordance with aspects of the present disclosure.

FIG. 1 illustrates an example of a wireless communication system 100 that supports carrier switching restriction rules for UCI in accordance with aspects of the present disclosure. The wireless communication system 100 may include one or more base stations 105, one or more UEs 115, and a core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may identify UCI to be transmitted using a first carrier of a carrier group associated with a cell group. The UE 115 may perform, based at least in part on a carrier selection rule, a carrier selection from the first carrier to a second carrier of the carrier group to transmit the UCI, the carrier selection rule based at least in part on a type of UCI to be transmitted, a priority level associated with the UCI, a timing for transmission of the UCI with respect to an associated downlink transmission, or a combination thereof. The UE 115 may transmit the UCI to one or more cells in the cell group using the second carrier.

Figure 2:
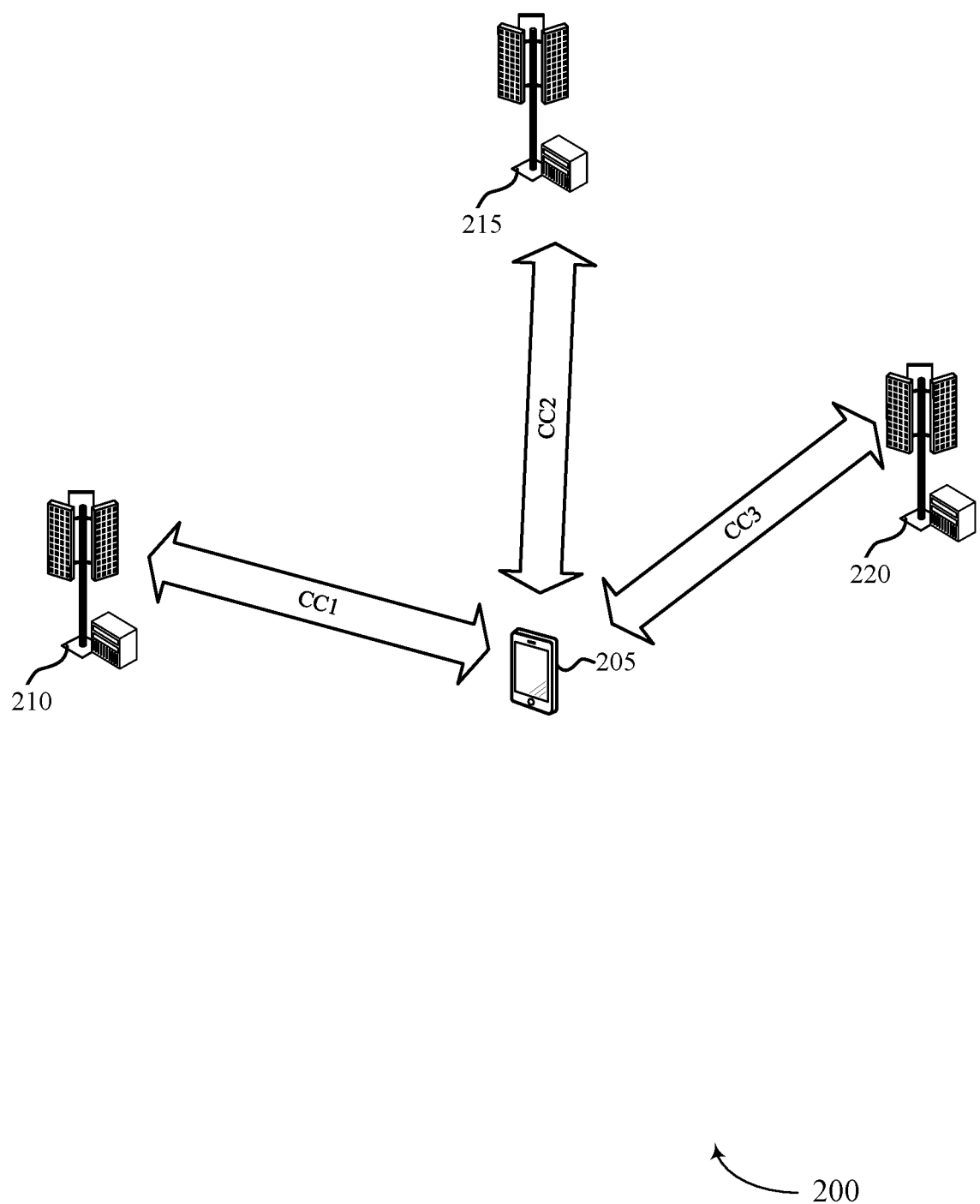
FIG. 2 illustrates an example of a wireless communication system that supports carrier switching restriction rules for UCI in accordance with aspects of the present disclosure.

FIG. 2 illustrates an example of a wireless communication system 200 that supports carrier switching restriction rules for UCI in accordance with aspects of the present disclosure. Wireless communication system 200 may implement aspects of wireless communication system 100. Wireless communication system 200 may include UE 205, base station 210, base station 215, and/or a base station 220, which may be examples of the corresponding devices described herein.

In some aspects, base station 210, base station 215, and/or a base station 220 may form a cell group configured for UE 205. In some aspects, the cell group may include base stations (e.g., cells) communicating with UE 205 on multiple carriers within a corresponding carrier group. For example, base station 210 may communicate with UE 205 using CC1, base station 215 may communicate with UE 205 using CC2, and/or base station 220 may communicate with UE 205 using CC3. In this example, the carrier group may include CC1, CC2, and CC3, although more of fewer than three carriers may be included in a carrier group.

In some wireless communication systems, PUCCH (e.g., UCI) may only be transmitted on the primary cell (PCell) and/or a PUCCH secondary cell (PUCCH-SCell) within the PUCCH group (e.g., the cell group) in uplink carrier aggregation. In the situation where base station 210 is the PCell within the cell group, such techniques may not provide UE 205 with any mechanism to provide a PUCCH transmission via base station 215 and/or base station 220 (e.g., when both are configured as SCells within the cell group). Accordingly, this technique may impose unnecessary latency reduction and/or reliability restrictions within the wireless network, which may be even more damaging within a TDD configured network. For example, a PDSCH transmission sent on CC1 may have an associated PUCCH occasion (e.g., HARQ-ACK feedback resources) configured on the PCell using CC1. This would result in UE 205 having to wait until the configured PCCH occasion on the PCell, even in the situation where there was an earlier PUCCH occasion configured on an SCell (e.g., configured uplink resources for any other UCI transmission via the SCell). Accordingly, this stringent rule may increase the latency associated with the PUCCH UCI as UE 205 would have to wait until the later configured PUCCH occasion on CC1.

Some wireless communication systems attempt to address this HARQ-ACK latency issue by allowing UE 205 to use an earlier configured PUCCH occasion on a different CC (e.g., CC2 or CC3). That is, such wireless communication systems may allow UE 205 to feed back HARQ-ACK earlier by using the PUCCH resources configured on other carriers in order to reduce the HARQ-ACK delay (e.g., for URLLC traffic). Such wireless communication systems may define a static rule for PUCCH carrier determination where UE 205 may follow the K1 indicated in the scheduling DCI (e.g., referenced to PCC numerology) to determine the slot to feed back HARQ-ACK information. In the determined slot, the first carrier having enough uplink OFDM symbols (e.g., sufficient time, spatial, and/or frequency resources) to accommodate the HARQ-ACK PUCCH resource may be used to transmit the HARQ-ACK. Generally, the first available carrier to be considered may have a predefined ordering of carriers, such as CC1 first, CC2 second, CC3 next, and so forth. This may support the earliest PUCCH occasion on CC2 (for example) to be selected for HARQ-ACK feedback.

Accordingly, some wireless communication systems support PUCCH carrier switching for UE 205. For example, multiple carriers in a group of carriers (e.g., a carrier group) may be configured with PUCCH resources. UE 205, in this situation, can feed back HARQ-ACK via the earliest PUCCH resource configured on any CC in the group of CCs, e.g., in order to reduce HARQ-ACK latency. While this may provide some measure of relief for HARQ-ACK latency, this approach is rigid, limited, and provides an incomplete solution to UCI transmissions more generally. For example, such techniques may not consider, and therefore may not provide meaningful solutions for, other types of UCI (e.g., SR, CSI reports, etc.). Moreover, such techniques are limited in that they do not consider the priority of the UCI transmission when performing carrier selection. For example, such techniques may reallocate an earlier PUCCH occasion originally scheduled for a high priority SR transmission to a lower priority HARQ-ACK transmission, a HARQ-ACK transmission with sufficient time left before expiration of a corresponding expiration timer, etc. As another example, such techniques do not consider the corresponding downlink data and scheduled carrier expiration time for the HARQ-ACK.

Accordingly, aspects of the described techniques provide improved rules (e.g., a carrier selection rule) for carrier selection by UE 205 for PUCCH UCI transmissions within a cell group. Broadly, the carrier selection rule may be based on the type of UCI being transmitted, the priority level of the UCI, a timing for transmission of the UCI with respect to an associated downlink transmission (e.g., a PDSCH transmission), and the like. Accordingly, instead of using the earliest PUCCH resource on any carrier in the carrier group, the carrier selection rule may be adopted such that the candidate PUCCH carriers and/or corresponding carrier selection rule may depend on such factors. The factor corresponding to the type of UCI may include whether the UCI is a HARQ-ACK PUCCH UCI transmission, a scheduling request PUCCH UCI transmission, and/or a channel state information (CSI) report PUCCH transmission, alone or in any combination. Other types of UCI transmissions may also be considered. Another factor may include the priority (e.g., PHY priority) of the uplink transmission (e.g., of the PUCCH UCI transmission), e.g., a high priority level or a low priority level. Another factor may include, in the situation where the PUCCH UCI is a HARQ-ACK transmission, the timing for transmission of the UCI with respect to the associated downlink data transmission (e.g., the corresponding downlink data expiration time and scheduled CC).

For example, UE 205 may identify or otherwise determine that it has UCI to be transmitted using a first carrier (e.g., CC1 in this example). For example, UE 205 may determine that it is scheduled to perform the UCI transmission based on an uplink buffer receiving data for transmission, UE 205 having a CSI measurement to report, UE 205 being configured to transmit HARQ-ACK feedback, and the like. In some aspects, the UCI may carry or otherwise convey an indication of the HARQ-ACK information, the SR, and/or the CSI report. In some aspects, the UCI may be configured for transmission in one PUCCH/PUSCH occasion and/or an multiple PUSCH/PUSCH occasions.

The type of UCI being conveyed may depend on the information being conveyed in the UCI. One type of UCI may include HARQ-ACK only information. Another type of UCI may include HARQ-ACK information plus a SR. Another type of UCI may include a CSI report only. Another type of UCI may include HARQ-ACK information plus a CSI report. Another type of UCI may include HARQ-ACK information, plus a SR, plus a CSI report. Accordingly, UE 205 may determine the type of UCI to be transmitted based on the contents of the UCI.

In some aspects, the UCI may initially be configured for transmission using a first carrier (e.g., CC1) of the carrier group (e.g., consisting of CC1, CC2, and CC3, in this example). However, UE 205 may perform carrier selection from the first carrier (CC1) to a second carrier (CC2 and/or CC3) based on the carrier selection rule. That is, UE 205 may select the second carrier to perform the UCI transmission according to the carrier selection rule. As discussed above, the carrier selection rule may be based on the type of UCI, priority level of the UCI, UCI transmission timing with respect to the associated downlink transmission (e.g., for HARQ-ACK information), and the like.

That is, the carrier selection rule may be adopted by UE 205 to select the second carrier based on such factors. In some aspects, the carrier selection rule may define certain of the carriers within the carrier group as being available for selection based on such factors (e.g., candidate PUCCH carriers). That is, UE 205 may identify or otherwise determine a subset of carriers in the carrier group as being available for transmitting the UCI based on the carrier selection rule (e.g., based on such factors). The subset of carriers may include at least the second carrier (e.g., CC1 and CC2, CC1 and CC3, etc.). In some aspects, different subsets of carriers may be defined according to the carrier selection rule. For example, a first subset of carriers may be defined for a first type of UCI, UCI priority level, and/or UCI transmission timing and a second subset of carriers may be defined for a second type of UCI, UCI priority level, and/or UCI transmission timing. More than two subsets of carriers may be defined according to the carrier selection rule, based on the number of carriers within the carrier group, etc.

In some aspects, UE 205 may, in accordance with the carrier selection rule, prioritize one or more carriers in the subset of carriers based on such factors. For example, the first subset of carriers may include CC1 and CC3 (in one example) and UE 205 may first attempt to perform the UCI transmission on CC1 first, and next on CC3. However, in some aspects UE 205 may prioritize one carrier (e.g., CC1) based on one/some factors and prioritize the other carrier (e.g., CC3) based on other factors. For example and using the HARQ-ACK UCI feedback, in the slot indicated by K1, UE 205 may select the first PUCCH CC with enough uplink symbols for a high priority uplink transmission (e.g., a UCI having a priority level satisfying a priority threshold) in a predefined ordering of carriers, such as PCC first, SCC1 next, and then SCC2, while a lower priority uplink transmission (e.g., a UCI having a priority level failing to satisfy the priority threshold) can select the PUCCH CC in the reverse order (e.g., SCC2 first, SCC1 next, and then PCC last). Prioritization of the carriers within the carrier group and/or carriers within a subset of carriers may be based on any factors, alone or in any combination, such as UCI type, UCI priority level, UCI transmission timing, etc.

In some aspects, UE 205 may be configured (e.g., using RRC signaling, a MAC CE, a DCI, higher layer signaling, and the like) with the carrier selection rule and/or subsets of carriers. For example, base station 210 (e.g., the PCell within the cell group) may transmit a signal (e.g., a RRC signal, a MAC CE signal, a DCI, etc.) to UE 205 carrying or otherwise conveying information identifying the carrier selection rule, which may be used to select or otherwise organize the carrier group into the different subsets of carriers depending on various factors, alone or in any combination. In some aspects, the signal may identify the carrier selection rule and the subset of carrier or may identify the carrier selection rule, which may be used to identify the subset(s) of carriers.

Accordingly, UE 205 may perform carrier selection to switch from the first carrier (e.g., CC1) to the second carrier (e.g., CC2 or CC3) according to the carrier selection rule. As discussed, one factor considered in the carrier selection rule may include the type of UCI (e.g., HARQ-ACK, SR, CSI report, HARQ-ACK+SR, HARQ-ACK+CSI report, HARQ-ACK+SR+CSI report). For example, UE 205 may select a carrier within the carrier group/from a particular subset of carriers within the carrier group based on the type of UCI being transmitted. In one non-limiting example, the candidate PUCCH CCs for a HARQ-ACK transmission may be all CCs configured with PUCCH in the carrier group, with the candidate PUCCH CCs for a SR and/or CSI report transmission may be a subset of CCs configured with PUCCH in the CC group. For example, if UE 205 determines that the UCI type is an uplink feedback message (e.g., HARQ-ACK information), UE 205 may select the second carrier from the carrier group. If UE 205 determines that the UCI type is a SR and/or CSI report, UE 205 may select the second carrier from a subset of carriers in the carrier group.

Another factor considered in the carrier selection rule may include the priority level of the UCI (e.g., the PHY priority of the uplink transmission). For example, UE 205 may select the second carrier from within the carrier group and/or from within a subset of carriers drawn from the carrier group based on whether or not the priority level of the UCI satisfies a corresponding priority threshold. In some examples, different carriers within the carrier group may be associated with different frequency ranges (e.g., FR1, FR2, etc.). Accordingly, UE 205 performing the carrier selection from the first carrier to the second carrier may correspond to selecting carriers in different frequency ranges according to the carrier selection rule. In one example and based on the priority level factor, this may include the candidate PUCCH CCs for a high priority uplink transmission (e.g., for UCI priority level satisfying a priority threshold) being carriers configured with PUCCH on a sub-6 GHz frequency range (e.g., FR1) in the carrier group, while the candidate PUCCH CCs for a low priority uplink transmission (e.g., for UCI priority level failing to satisfy the priority threshold), being carriers configured with PUCCH on a non-sub-6 GHz frequency range (e.g., FR2). Accordingly, UE 205 may select the second carrier associated with FR1 or FR2 based on the priority level of the UCI satisfying, or failing to satisfy, a corresponding priority threshold.

Another factor considered in the carrier selection rule may include, in the situation where the UCI conveys HARQ-ACK, the remaining validity time for the corresponding downlink data and scheduled carrier (e.g., the UCI transmission timing with respect to the corresponding downlink data transmission). That is, aspects of HARQ-ACK transmission timing may generally be indicated in the DCI scheduling the corresponding PDSCH transmission (e.g., in the K1 value). Generally, the base station scheduling the PDSCH transmission may therefore expect HARQ-ACK feedback prior to the timing corresponding to K1. If no HARQ-ACK feedback is timely received, the base station may assume the PDSCH transmission was not successfully received and decoded by the UE and therefore begin the PDSCH retransmission. Moreover, the PDSCH transmission may be associated with a corresponding HARQ process identifier number, which may have a corresponding expiration timer. Accordingly, transmission timing of the UCI (e.g., with respect to the expiration timer(s)) may be used as a factor when selecting the second carrier. For example, UE 205 may select the second carrier from within the carrier group/from within a subset of carriers drawn from the carrier group based on the transmission timing of the UCI. For example, UE 205 may select the second carrier if it is the first configured PUCCH occasion when the timer is nearing expiration or select the second carrier if it is a later configured PUCCH occasion when the timer is not near expiration (e.g., to allow a higher priority SR transmission). Accordingly, UE 205 may determine whether timing for transmission of the UCI satisfies, or fails to satisfy, a timing threshold (e.g., the timing threshold being with respect to the expiration timer). UE 205 may select the second carrier from within the carrier group/from within a particular subset of carriers drawn from the carrier group based on whether or not the UCI transmission timing satisfies or fails to satisfy the timing threshold. In the situation where the second carrier candidates correspond to carriers in different frequency ranges, this may include UE 205 selecting the second carrier in the sub-6 GHz frequency range (e.g., FR1) when the transmission timing of the UCI satisfies the timing threshold or the second carrier in the non-sub-6 GHz frequency range (e.g., FR2) when the transmission timing of the UCI fails to satisfy timing threshold, or vice versa.

As discussed, in some examples one or more of the factors may be considered together. For example, each factor may be afforded equal weight and/or weighting metrics may be applied to different factors according to the carrier selection rule. In some aspects, one factor may trump another factor (e.g., a high priority CSI report may trump HARQ-ACK information having sufficient time remaining on the expiration timer). In some aspects, the payload of the UCI may be considered in application of the carrier selection rule.

Accordingly, UE 205 may transmit the UCI to the cells in the cell group (e.g., to base station 210, base station 215, and/or base station 220) using the second carrier. As the cells within the cell group may communicate with UE 205 more efficiently, this may provide a mechanism for UE 205 to perform UCI transmissions more intelligently and efficiently using carriers within the carrier group according to the carrier selection rule.

Figure 3:
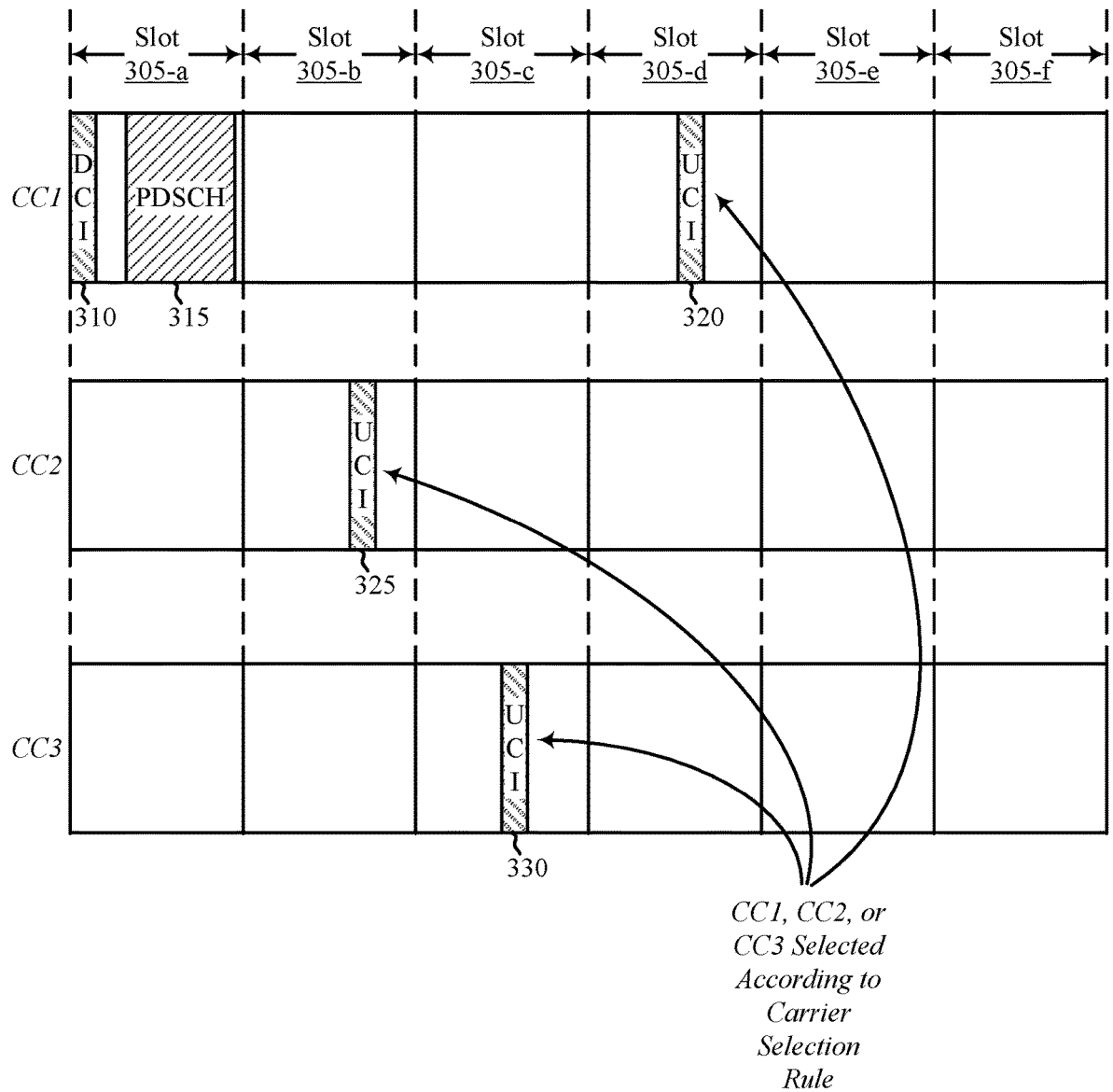
FIG. 3 illustrates an example of a carrier group that supports carrier switching restriction rules for UCI in accordance with aspects of the present disclosure.

FIG. 3 illustrates an example of a carrier group 300 that supports carrier switching restriction rules for UCI in accordance with aspects of the present disclosure. Carrier group 300 may implement aspects of wireless communication systems 100 and/or 200. Aspects of carrier group 300 may be implemented in slots 305-*a*, 305-*b*, 305-*c*, 305-*d*, 305-*e*, and 305-*f* by a base station and/or a UE, which may be examples of corresponding devices described herein.

Generally, a UE may be configured with a cell group comprising one or more base stations, RRHs, TRPs, etc. The cell group may include a plurality of carriers being used for communications between the UE and the cell group, which may be considered a carrier group. In the non-limiting example illustrated in FIG. 3, the carrier group may include CCT, CC2, and CC3, although it is to be understood that the carrier group may have fewer or more than three carriers. Within the cell group, at least one cell may be considered the PCell and the other cells may be considered the SCells.

As discussed above, aspects of the described techniques provide for a carrier selection rule to be applied by the UE when performing carrier selection for UCI transmission on a carrier within a carrier group. For example, the UE may identify or otherwise determine that it has UCI to transmit using a first carrier of a carrier group. The UCI transmission may carry or otherwise convey HARQ-ACK information, a SR, and/or a CSI report. The UE may identify or otherwise select the carrier selection rule to use for carrier selection/switching from the first carrier to a second carrier of the carrier group. The carrier selection rule may be based on the UCI type (e.g., HARQ-ACK, SR, and/or CSI report), on the priority level of the UCI (e.g., with respect to a priority threshold), and/or a timing for transmission of the UCI with respect to an associated downlink transmission. Accordingly, the UE may transmit the UCI to the cell(s) within the cell group using the second carrier. Carrier group 300 illustrates an example carrier selection rule application in the situation where the UCI transmission carries or otherwise conveys HARQ-ACK information. However, it is to be understood that these techniques may also be equally applicable for other UCI types.

At least one cell within the cell group (e.g., the PCell using CC1) may transmit downlink control information (DCI), such as a scheduling DCI 310, to the UE using the first carrier and during slot 305-a. The scheduling DCI 310 may schedule a corresponding downlink data transmission (e.g., PDSCH 315) also during slot 305-a. For example, the scheduling DCI 310 may carry or otherwise convey an indication of time, frequency, spatial, and/or code resources, as well as corresponding DMRS resources, that the UE is to monitor in order to receive PDSCH 315. The scheduling DCI 315 may also identify a PUCCH occasion 320 (e.g., uplink time, frequency, spatial, and/or code resources) during slot 305-d in which the UE is to transmit HARQ-ACK feedback information for PDSCH 315. That is, PUCCH occasion 320 may correspond to acknowledgement/negative-acknowledgement (ACK/NACK) information indicating whether or not the UE was able to successfully receive and decode PDSCH 315. Accordingly, the UE may identify or otherwise determine UCI (e.g., the HARQ-ACK information) to be transmitted using the first carrier (CC1 in this example) within the carrier group associated with the cell group.

The UE may, however, perform carrier selection from the first carrier (e.g., CC1) to a second carrier of the carrier group for the UCI transmission (e.g., the HARQ-ACK information) according to the carrier selection rule. As discussed above, the carrier selection rule may consider factors such as the type of UCI, the priority level of the UCI, and timing for transmission of the UCI with respect to an associated downlink transmission (e.g., with respect to PDSCH 315). Accordingly, the UE may select the second carrier from within the carrier group/from within a particular subset of carriers drawn from the carrier group based on the type of UCI being conveyed (e.g., HARQ-ACK information in this example).

For example, the UE may identify PUCCH occasion 325 configured on CC2 during slot 305-b and PUCCH occasion 330 configured on CC3 during slot 305-c. The UE may determine whether either or both of PUCCH occasion 325 and/or PUCCH occasion 330 includes enough resources (e.g., time, frequency, spatial, code, etc. resources) to carry or otherwise convey the HARQ-ACK information. Either carrier not having sufficient resources configured within its PUCCH occasion may be disregarded from consideration. When both carriers have sufficient resources, the UE may apply the factors of the carrier selection rule for selecting the second carrier (e.g., CC2 using PUCCH occasion 325 or CC3 using PUCCH occasion 330). For example, the UE may select CC2 or CC3 as the second carrier based on the UCI type being HARQ-ACK information. The UE may select CC2 or CC3 as the second carrier based on the priority level of the HARQ-ACK information satisfying a priority threshold. The UE may select CC2 or CC3 as the second carrier based on the transmission timing of the UCI (e.g., based on whether the transmission timing of the UCI satisfies a timing threshold. In some aspects, the UE may consider the factors alone or in any combination. The UE may consider the factors equally or may apply various weighting factors to one, some, or all of the factors.

Accordingly, the UE may transmit the UCI to the cell(s) within the cell group using the second carrier. That is, the candidate PUCCH carriers can be jointly determined by multiple factors, which may be indicated to the UE implicitly (e.g., adopted in the relevant standards) and/or using explicit signaling (e.g., RRC signaling, MAC CE, DCI, etc.).

Figure 4:
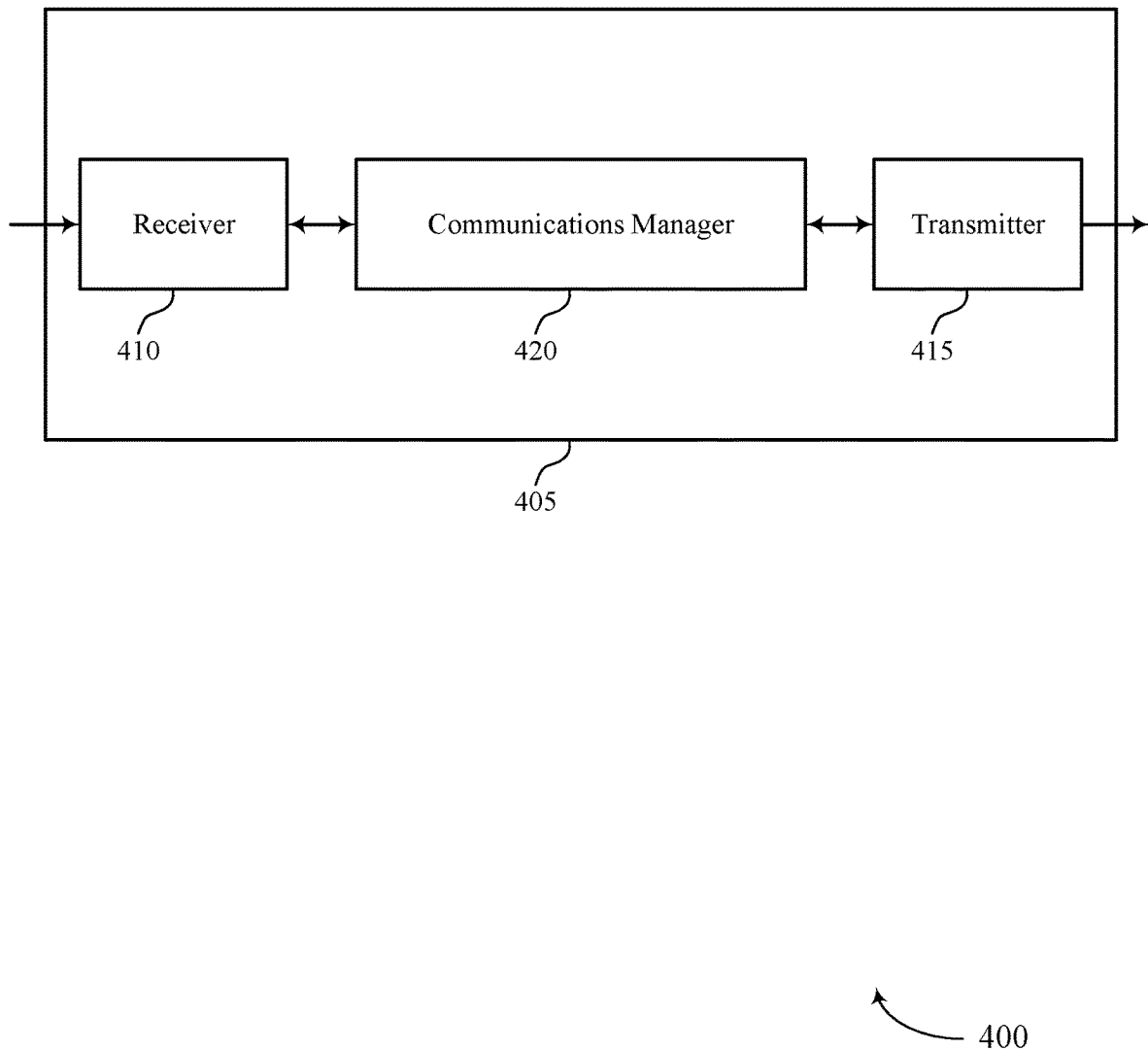
FIGS. 4 and 5 show block diagrams of devices that support carrier switching restriction rules for UCI in accordance with aspects of the present disclosure.

FIG. 4 shows a block diagram 400 of a device 405 that supports carrier switching restriction rules for UCI in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to carrier switching restriction rules for UCI). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to carrier switching restriction rules for UCI). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of carrier switching restriction rules for UCI as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for identifying UCI to be transmitted using a first carrier of a carrier group associated with a cell group. The communications manager 420 may be configured as or otherwise support a means for performing, based on a carrier selection rule, a carrier selection from the first carrier to a second carrier of the carrier group to transmit the UCI, the carrier selection rule based on a type of UCI to be transmitted, a priority level associated with the UCI, a timing for transmission of the UCI with respect to an associated downlink transmission, or a combination thereof. The communications manager 420 may be configured as or otherwise support a means for transmitting the UCI to one or more cells in the cell group using the second carrier.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for improved flexibility and efficiency for carrier selection by a UE for UCI transmissions in uplink carrier aggregation.

Figure 5:
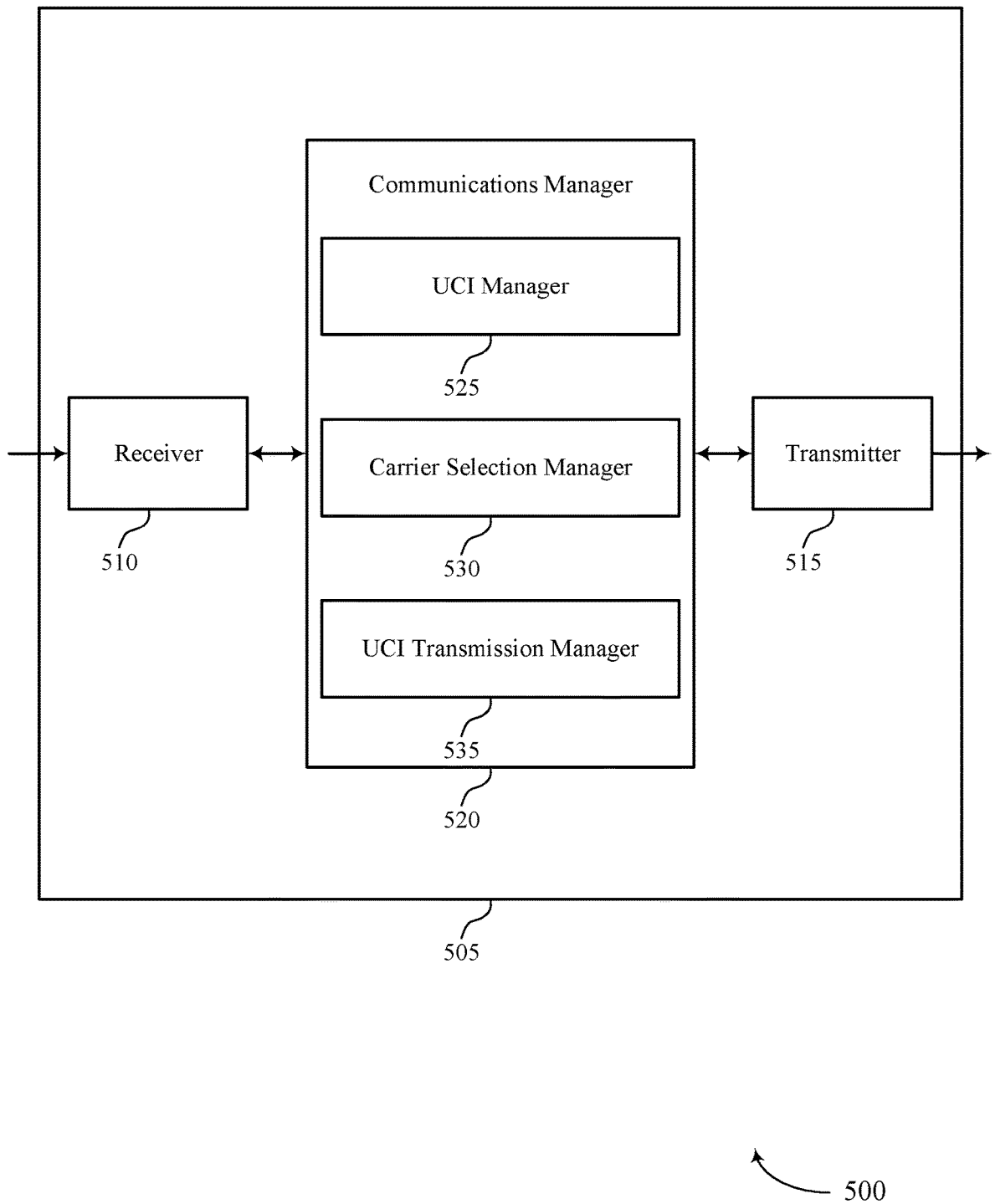

FIG. 5 shows a block diagram 500 of a device 505 that supports carrier switching restriction rules for UCI in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to carrier switching restriction rules for UCI). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to carrier switching restriction rules for UCI). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of carrier switching restriction rules for UCI as described herein. For example, the communications manager 520 may include a UCI manager 525, a carrier selection manager 530, a UCI transmission manager 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The UCI manager 525 may be configured as or otherwise support a means for identifying UCI to be transmitted using a first carrier of a carrier group associated with a cell group. The carrier selection manager 530 may be configured as or otherwise support a means for performing, based on a carrier selection rule, a carrier selection from the first carrier to a second carrier of the carrier group to transmit the UCI, the carrier selection rule based on a type of UCI to be transmitted, a priority level associated with the UCI, a timing for transmission of the UCI with respect to an associated downlink transmission, or a combination thereof. The UCI transmission manager 535 may be configured as or otherwise support a means for transmitting the UCI to one or more cells in the cell group using the second carrier.

Figure 6:
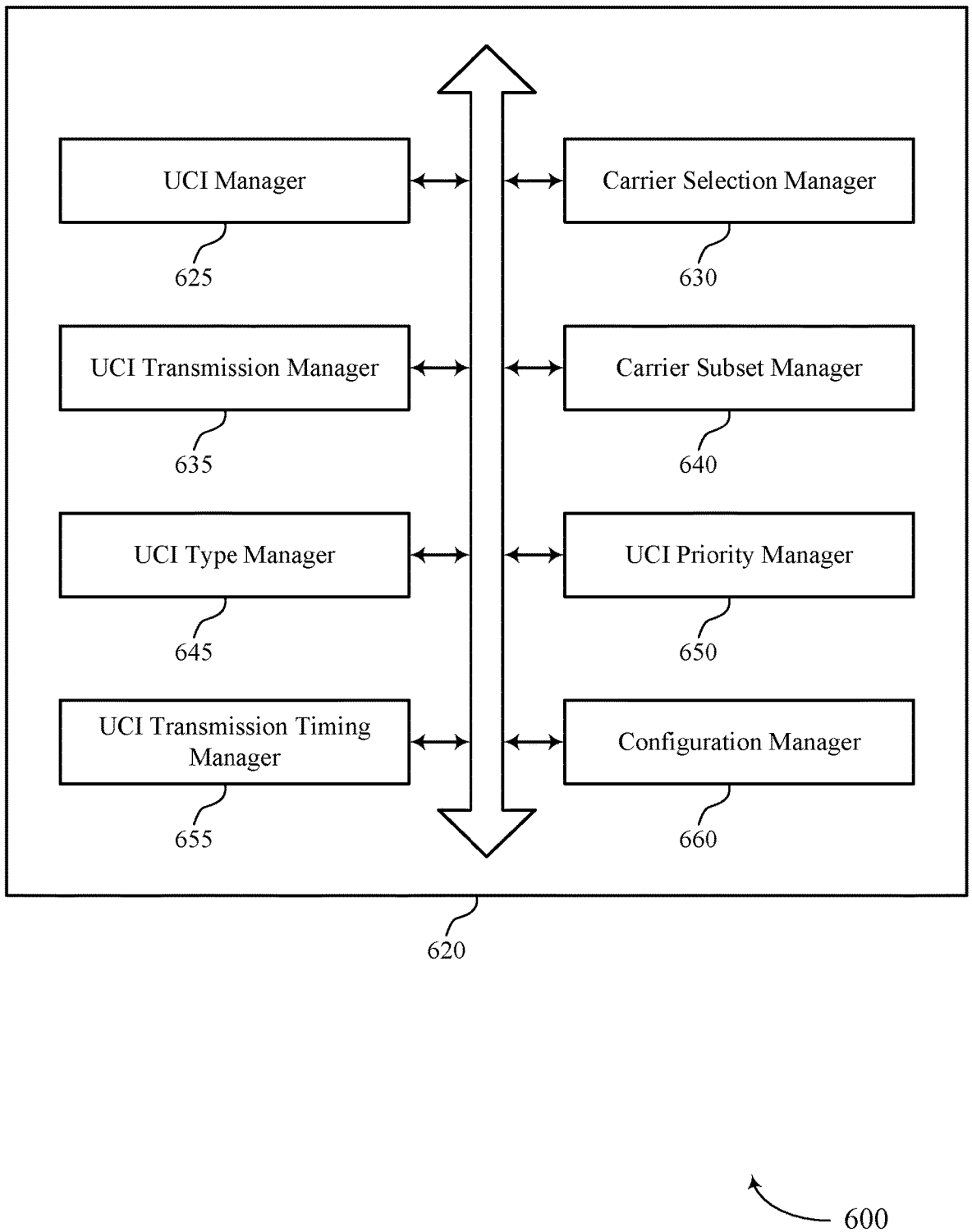
FIG. 6 shows a block diagram of a communications manager that supports carrier switching restriction rules for UCI in accordance with aspects of the present disclosure.

FIG. 6 shows a block diagram 600 of a communications manager 620 that supports carrier switching restriction rules for UCI in accordance with aspects of the present disclosure. The communications manager 620 may be an example of aspects of a communications manager 420, a communications manager 520, or both, as described herein. The communications manager 620, or various components thereof, may be an example of means for performing various aspects of carrier switching restriction rules for UCI as described herein. For example, the communications manager 620 may include a UCI manager 625, a carrier selection manager 630, a UCI transmission manager 635, a carrier subset manager 640, a UCI type manager 645, a UCI priority manager 650, a UCI transmission timing manager 655, a configuration manager 660, or any combination thereof. Each of these components may communicate, directly or indirectly, with one another (e.g., via one or more buses).

The communications manager 620 may support wireless communication at a UE in accordance with examples as disclosed herein. The UCI manager 625 may be configured as or otherwise support a means for identifying UCI to be transmitted using a first carrier of a carrier group associated with a cell group. The carrier selection manager 630 may be configured as or otherwise support a means for performing, based on a carrier selection rule, a carrier selection from the first carrier to a second carrier of the carrier group to transmit the UCI, the carrier selection rule based on a type of UCI to be transmitted, a priority level associated with the UCI, a timing for transmission of the UCI with respect to an associated downlink transmission, or a combination thereof. The UCI transmission manager 635 may be configured as or otherwise support a means for transmitting the UCI to one or more cells in the cell group using the second carrier.

In some examples, the carrier subset manager 640 may be configured as or otherwise support a means for identifying, based on the carrier selection rule, a subset of carriers in the carrier group available for transmitting the UCI, the subset of carriers including at least the second carrier.

In some examples, the carrier subset manager 640 may be configured as or otherwise support a means for prioritizing one or more carriers in the subset of carriers based on the type of UCI to be transmitted. In some examples, the carrier subset manager 640 may be configured as or otherwise support a means for selecting the second carrier from the subset of carriers based on the prioritizing.

In some examples, the carrier subset manager 640 may be configured as or otherwise support a means for receiving a signal indicating the subset of carriers, the signal including at least one of an RRC signal, a medium access control (MAC) control element (CE), a DCI, or a combination thereof.

In some examples, the UCI type manager 645 may be configured as or otherwise support a means for determining that the type of UCI includes an uplink feedback message associated with the downlink transmission. In some examples, the UCI type manager 645 may be configured as or otherwise support a means for selecting the second carrier from the carrier group based on the uplink feedback message.

In some examples, the UCI type manager 645 may be configured as or otherwise support a means for determining that the type of UCI includes a scheduling request, a CSI report, or both. In some examples, the UCI type manager 645 may be configured as or otherwise support a means for selecting the second carrier from a subset of carriers in the carrier group based on the scheduling request, the CSI report, or both.

In some examples, the UCI priority manager 650 may be configured as or otherwise support a means for determining that the priority level associated with the UCI satisfies a priority threshold. In some examples, the UCI priority manager 650 may be configured as or otherwise support a means for selecting the second carrier associated with a sub-6 GHz frequency range based on the priority level.

In some examples, the UCI priority manager 650 may be configured as or otherwise support a means for determining that the priority level associated with the UCI fails to satisfy a priority threshold. In some examples, the UCI priority manager 650 may be configured as or otherwise support a means for selecting the second carrier associated with a non-sub-6 GHz frequency range based on the priority level.

In some examples, the UCI transmission timing manager 655 may be configured as or otherwise support a means for determining that the timing for transmission of the UCI satisfies a timing threshold. In some examples, the UCI transmission timing manager 655 may be configured as or otherwise support a means for selecting the second carrier associated with a sub-6 GHz frequency range based on the timing.

In some examples, the UCI transmission timing manager 655 may be configured as or otherwise support a means for determining that the timing for transmission of the UCI fails to satisfy a timing threshold. In some examples, the UCI transmission timing manager 655 may be configured as or otherwise support a means for selecting the second carrier associated with a non-sub-6 GHz frequency range based on the timing.

In some examples, the configuration manager 660 may be configured as or otherwise support a means for receiving a signal indicating the carrier selection rule, the signal including at least one of an RRC signal, a MAC CE, a DCI, or a combination thereof.

Figure 7:
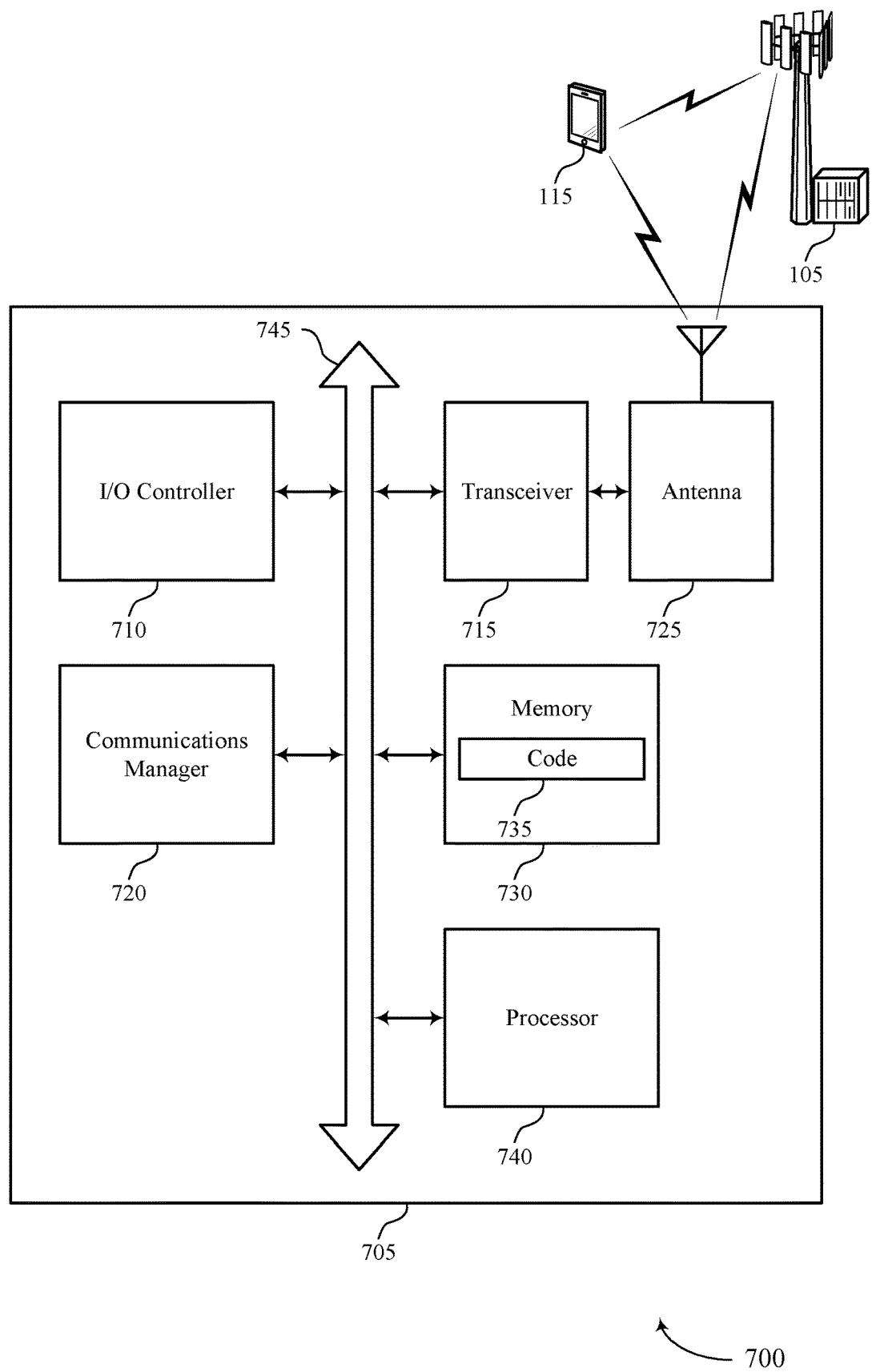
FIG. 7 shows a diagram of a system including a device that supports carrier switching restriction rules for UCI in accordance with aspects of the present disclosure.

FIG. 7 shows a diagram of a system 700 including a device 705 that supports carrier switching restriction rules for UCI in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting carrier switching restriction rules for UCI). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for identifying UCI to be transmitted using a first carrier of a carrier group associated with a cell group. The communications manager 720 may be configured as or otherwise support a means for performing, based on a carrier selection rule, a carrier selection from the first carrier to a second carrier of the carrier group to transmit the UCI, the carrier selection rule based on a type of UCI to be transmitted, a priority level associated with the UCI, a timing for transmission of the UCI with respect to an associated downlink transmission, or a combination thereof. The communications manager 720 may be configured as or otherwise support a means for transmitting the UCI to one or more cells in the cell group using the second carrier.

By including or configuring the communications manager 720 in accordance with examples as described herein, the device 705 may support techniques for improved flexibility and efficiency for carrier selection by a UE for UCI transmissions in uplink carrier aggregation.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of carrier switching restriction rules for UCI as described herein, or the processor 740 and the memory 730 may be otherwise configured to perform or support such operations.

Figure 8:
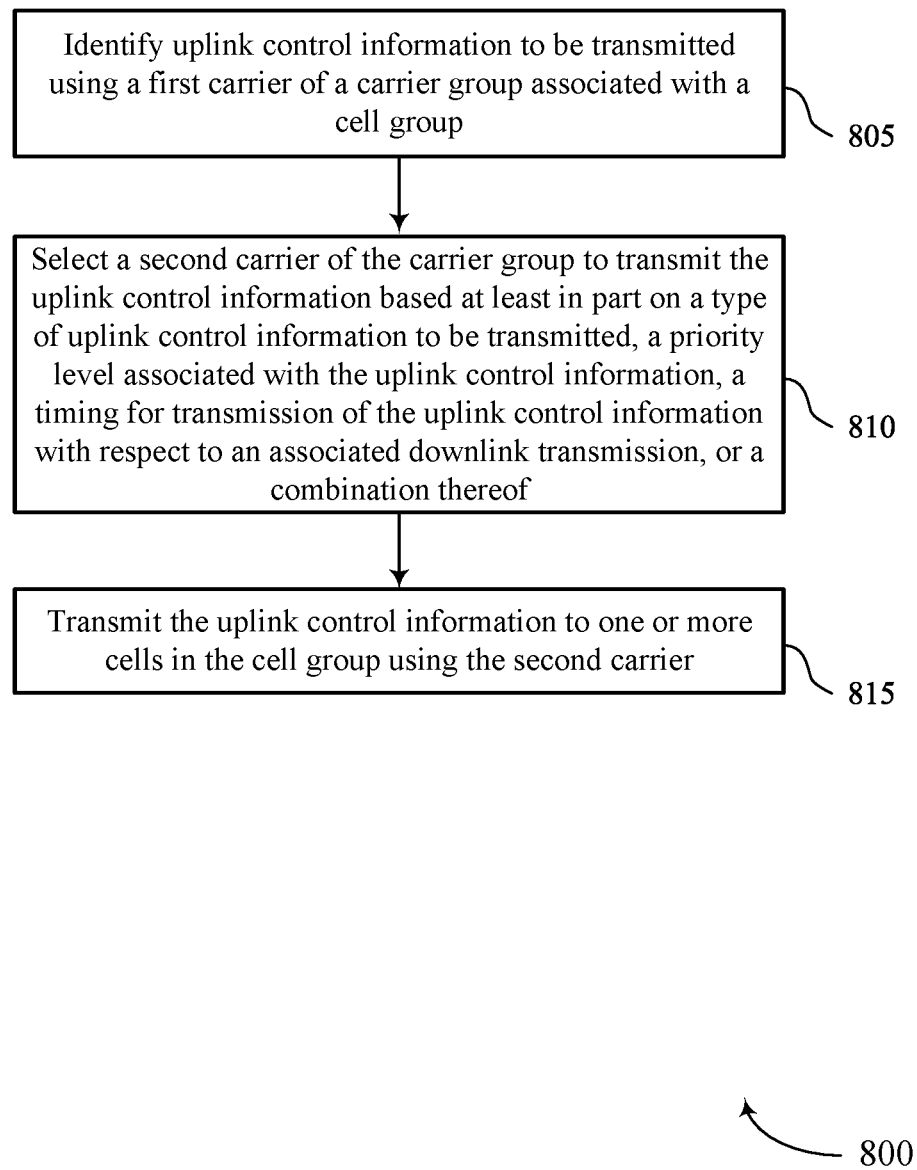
FIGS. 8 through 10 show flowcharts illustrating methods that support carrier switching restriction rules for UCI in accordance with aspects of the present disclosure.

FIG. 8 shows a flowchart illustrating a method 800 that supports carrier switching restriction rules for UCI in accordance with aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 805, the method may include identifying UCI to be transmitted using a first carrier of a carrier group associated with a cell group. The operations of 805 may be performed in accordance with examples as disclosed herein. In some examples, aspects of the operations of 805 may be performed by a UCI manager 625 as described with reference to FIG. 6.

At 810, the method may select a second carrier of the carrier group to transmit the UCI based at least in part on a type of UCI to be transmitted, a priority level associated with the UCI, a timing for transmission of the UCI with respect to an associated downlink transmission, or a combination thereof. The operations of 810 may be performed in accordance with examples as disclosed herein. In some examples, aspects of the operations of 810 may be performed by a carrier selection manager 630 as described with reference to FIG. 6.

At 815, the method may include transmitting the UCI to one or more cells in the cell group using the second carrier. The operations of 815 may be performed in accordance with examples as disclosed herein. In some examples, aspects of the operations of 815 may be performed by a UCI transmission manager 635 as described with reference to FIG. 6.

Figure 9:
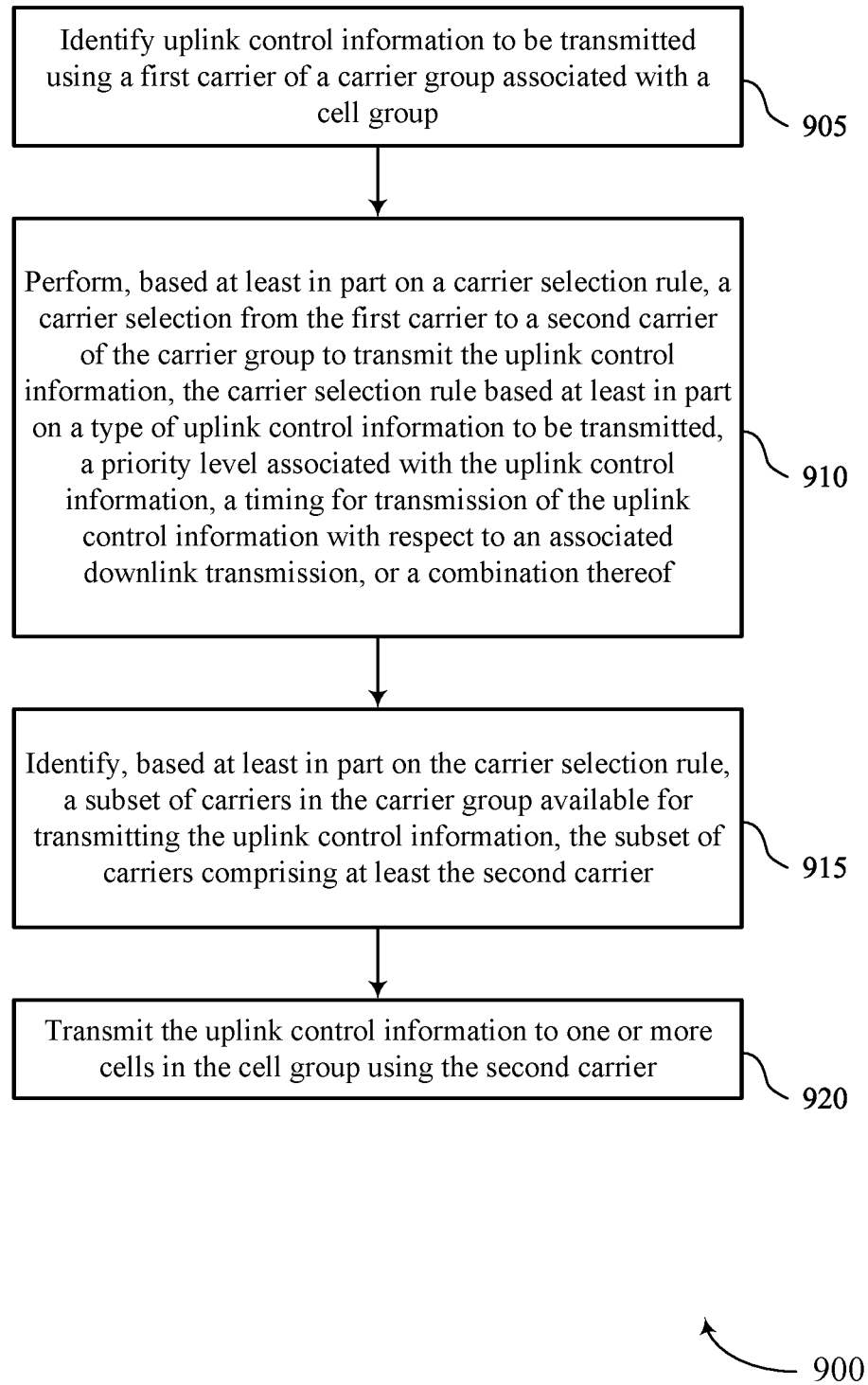

FIG. 9 shows a flowchart illustrating a method 900 that supports carrier switching restriction rules for UCI in accordance with aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 905, the method may include identifying UCI to be transmitted using a first carrier of a carrier group associated with a cell group. The operations of 905 may be performed in accordance with examples as disclosed herein. In some examples, aspects of the operations of 905 may be performed by a UCI manager 625 as described with reference to FIG. 6.

At 910, the method may include performing, based on a carrier selection rule, a carrier selection from the first carrier to a second carrier of the carrier group to transmit the UCI, the carrier selection rule based on a type of UCI to be transmitted, a priority level associated with the UCI, a timing for transmission of the UCI with respect to an associated downlink transmission, or a combination thereof. The operations of 910 may be performed in accordance with examples as disclosed herein. In some examples, aspects of the operations of 910 may be performed by a carrier selection manager 630 as described with reference to FIG. 6.

At 915, the method may include identifying, based on the carrier selection rule, a subset of carriers in the carrier group available for transmitting the UCI, the subset of carriers including at least the second carrier. The operations of 915 may be performed in accordance with examples as disclosed herein. In some examples, aspects of the operations of 915 may be performed by a carrier subset manager 640 as described with reference to FIG. 6.

At 920, the method may include transmitting the UCI to one or more cells in the cell group using the second carrier. The operations of 920 may be performed in accordance with examples as disclosed herein. In some examples, aspects of the operations of 920 may be performed by a UCI transmission manager 635 as described with reference to FIG. 6.

Figure 10:
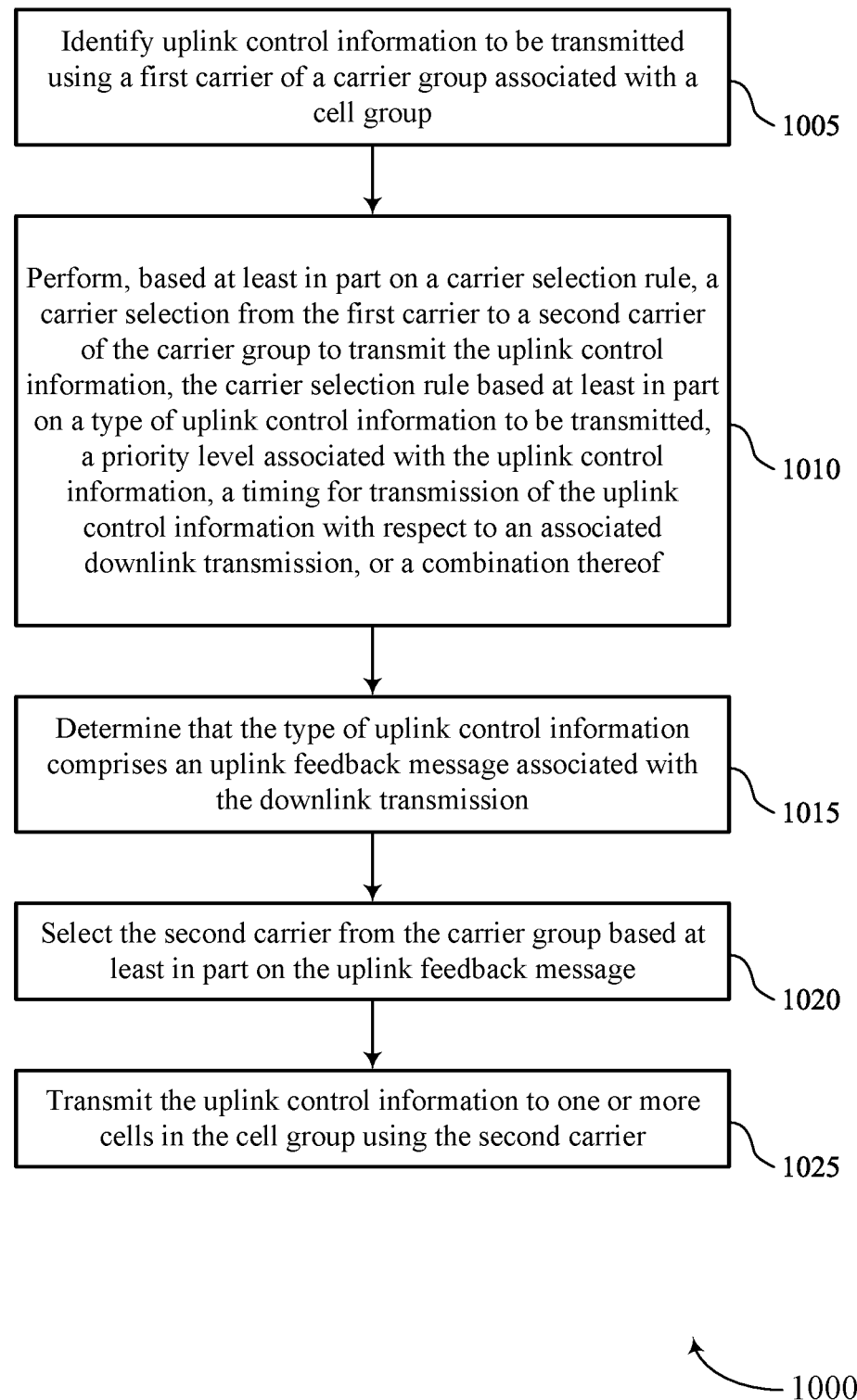

FIG. 10 shows a flowchart illustrating a method 1000 that supports carrier switching restriction rules for UCI in accordance with aspects of the present disclosure. The operations of the method 1000 may be implemented by a UE or its components as described herein. For example, the operations of the method 1000 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1005, the method may include identifying UCI to be transmitted using a first carrier of a carrier group associated with a cell group. The operations of 1005 may be performed in accordance with examples as disclosed herein. In some examples, aspects of the operations of 1005 may be performed by a UCI manager 625 as described with reference to FIG. 6.

At 1010, the method may include performing, based on a carrier selection rule, a carrier selection from the first carrier to a second carrier of the carrier group to transmit the UCI, the carrier selection rule based on a type of UCI to be transmitted, a priority level associated with the UCI, a timing for transmission of the UCI with respect to an associated downlink transmission, or a combination thereof. The operations of 1010 may be performed in accordance with examples as disclosed herein. In some examples, aspects of the operations of 1010 may be performed by a carrier selection manager 630 as described with reference to FIG. 6.

At 1015, the method may include determining that the type of UCI includes an uplink feedback message associated with the downlink transmission. The operations of 1015 may be performed in accordance with examples as disclosed herein. In some examples, aspects of the operations of 1015 may be performed by a UCI type manager 645 as described with reference to FIG. 6.

At 1020, the method may include selecting the second carrier from the carrier group based on the uplink feedback message. The operations of 1020 may be performed in accordance with examples as disclosed herein. In some examples, aspects of the operations of 1020 may be performed by a UCI type manager 645 as described with reference to FIG. 6.

At 1025, the method may include transmitting the UCI to one or more cells in the cell group using the second carrier.

The operations of 1025 may be performed in accordance with examples as disclosed herein. In some examples, aspects of the operations of 1025 may be performed by a UCI transmission manager 635 as described with reference to FIG. 6.

The following provides an overview of aspects of the present disclosure:

Aspect 1: A method for wireless communication at a UE, comprising: identifying UCI to be transmitted using a first carrier of a carrier group associated with a cell group; selecting a second carrier of the carrier group to transmit the UCI based at least in part on a type of UCI to be transmitted, a priority level associated with the UCI, a timing for transmission of the UCI with respect to an associated downlink transmission, or a combination thereof; and transmitting the UCI to one or more cells in the cell group using the second carrier.

Aspect 2: The method of aspect 1, further comprising: identifying, a subset of carriers in the carrier group available for transmitting the UCI, the subset of carriers comprising at least the second carrier.

Aspect 3: The method of aspect 2, further comprising: prioritizing one or more carriers in the subset of carriers based at least in part on the type of UCI to be transmitted; wherein the second carrier is selected from the subset of carriers based at least in part on the prioritizing.

Aspect 4: The method of any of aspects 2 through 3, further comprising: receiving a signal indicating the subset of carriers, the signal comprising at least one of an RRC signal, a MAC CE, a DCI, or a combination thereof.

Aspect 5: The method of any of aspects 1 through 4, wherein the second carrier is selected from the carrier group based at least in part on an uplink feedback message in the uplink control information.

Aspect 6: The method of any of aspects 1 through 5, wherein the second carrier is selected from a subset of carriers in the carrier group based at least in part on a scheduling request in the uplink control information, a channel state information (CSI) report in the uplink control information, or both.

Aspect 7: The method of any of aspects 1 through 6, wherein the second carrier is selected from a sub-6 GHz frequency range when the priority level associated with the UCI satisfies a priority threshold or based at least in part on the priority level associated with the UCI satisfying the priority threshold.

Aspect 8: The method of any of aspects 1 through 7, wherein the second carrier is selected from a non-sub-6 GHz frequency range when the priority level associated with the UCI fails to satisfy a priority threshold or based at least in part on the priority level associated with the UE failing to satisfy the priority threshold.

Aspect 9: The method of any of aspects 1 through 8, wherein the second carrier is selected from a sub-6 GHz frequency range when the timing for transmission of the UCI satisfies a timing threshold or based at least in part on the timing for transmission of the UCI satisfying the timing threshold.

Aspect 10: The method of any of aspects 1 through 9, wherein the second carrier is selected from a non-sub-6 GHz frequency range when the timing for transmission of the UCI fails to satisfy a timing threshold or based at least in part on the timing for transmission of the UCI failing to satisfy the timing threshold.

Aspect 11: The method of any of aspects 1 through 10, further comprising: receiving a signal indicating the carrier selection rule, the signal comprising at least one of an RRC signal, a MAC CE, a DCI, or a combination thereof.

Aspect 12: An apparatus for wireless communication at a UE, comprising a processor; memory coupled with the processor; and instructions stored in the memory and executable by the processor to cause the apparatus to perform a method of any of aspects 1 through 11.

Aspect 13: An apparatus for wireless communication at a UE, comprising at least one means for performing a method of any of aspects 1 through 11.

Aspect 14: A non-transitory computer-readable medium storing code for wireless communication at a UE, the code comprising instructions executable by a processor to perform a method of any of aspects 1 through 11.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure.

Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   at least one processor;
   at least one memory coupled with the at least one processor and configured to store instructions executable by the at least one processor to cause the UE to:
   identify uplink control information to be transmitted using a first carrier of a carrier group associated with a cell group;
   select a second carrier of the carrier group to transmit the uplink control information, wherein the selecting is based at least in part on a type of uplink control information to be transmitted, a priority level associated with the uplink control information, a timing for transmission of the uplink control information with respect to an associated downlink transmission, or a combination thereof; and
   transmit the uplink control information to one or more cells in the cell group using the second carrier.

2. The apparatus of claim 1, wherein the instructions are further executable by the at least one processor to cause the UE to:
   identify a subset of carriers in the carrier group available for transmitting the uplink control information, the subset of carriers comprising at least the second carrier.

3. The apparatus of claim 2, wherein the instructions are further executable by the at least one processor to cause the UE to:
   prioritize one or more carriers in the subset of carriers based at least in part on the type of uplink control information to be transmitted; wherein the second carrier is selected from the subset of carriers based at least in part on the prioritizing.

4. The apparatus of claim 2, wherein the instructions are further executable by the at least one processor to cause the UE to:
   receive a signal indicating the subset of carriers, the signal comprising at least one of a radio resource control (RRC) signal, a medium access control (MAC) control element (CE), a downlink control information (DCI), or a combination thereof.

5. The apparatus of claim 1, wherein the second carrier is selected from the carrier group based at least in part on an uplink feedback message in the uplink control information.

6. The apparatus of claim 1, wherein the second carrier is selected from a subset of carriers in the carrier group based at least in part on a scheduling request in the uplink control information, a channel state information (CSI) report in the uplink control information, or both.

7. The apparatus of claim 1, wherein the second carrier is selected from a sub-6 GHz frequency range based at least in part on the priority level associated with the uplink control information satisfying a priority threshold.

8. The apparatus of claim 1, wherein the second carrier is selected from a non-sub-6 GHz frequency range based at least in part on the priority level associated with the uplink control information failing to satisfy a priority threshold.

9. The apparatus of claim 1, wherein the second carrier is selected from a sub-6 GHz frequency range based at least in part on the timing for transmission of the uplink control information satisfying a timing threshold.

10. The apparatus of claim 1, wherein the second carrier is selected from a non-sub-6 GHz frequency range based at least in part on the timing for transmission of the uplink control information failing to satisfy a timing threshold.

11. The apparatus of claim 1, wherein the instructions are further executable by the at least one processor to cause the UE to:
    receive a signal indicating a carrier selection rule, the signal comprising at least one of a radio resource control (RRC) signal, a medium access control (MAC) control element (CE), a downlink control information (DCI), or a combination thereof.

12. A method for wireless communication at a user equipment (UE), comprising:
    identifying uplink control information to be transmitted using a first carrier of a carrier group associated with a cell group;
    selecting a second carrier of the carrier group to transmit the uplink control information, wherein the selecting is based at least in part on a type of uplink control information to be transmitted, a priority level associated with the uplink control information, a timing for transmission of the uplink control information with respect to an associated downlink transmission, or a combination thereof; and
    transmitting the uplink control information to one or more cells in the cell group using the second carrier.

13. The method of claim 12, further comprising:
    identifying a subset of carriers in the carrier group available for transmitting the uplink control information, the subset of carriers comprising at least the second carrier.

14. The method of claim 13, further comprising:
    prioritizing one or more carriers in the subset of carriers based at least in part on the type of uplink control information to be transmitted; wherein the second carrier is selected from the subset of carriers based at least in part on the prioritizing.

15. The method of claim 13, further comprising:
    receiving a signal indicating the subset of carriers, the signal comprising at least one of a radio resource control (RRC) signal, a medium access control (MAC) control element (CE), a downlink control information (DCI), or a combination thereof.

16. The method of claim 12, wherein the second carrier is selected from the carrier group based at least in part on an uplink feedback message in the uplink control information.

17. The method of claim 12, wherein the second carrier is selected from a subset of carriers in the carrier group based at least in part on a scheduling request in the uplink control information, a channel state information (CSI) report in the uplink control information, or both.

18. The method of claim 12, wherein the second carrier is selected from a sub-6 GHz frequency range when the priority level associated with the uplink control information satisfies a priority threshold, and wherein the second carrier is selected from a non-sub-6 GHz frequency range when the priority level associated with the uplink control information fails to satisfy the priority threshold.

19. The method of claim 12, wherein the second carrier is selected from a sub-6 GHz frequency range when the timing for transmission of the uplink control information satisfying a timing threshold, and wherein the second carrier is selected from a non-sub-6 GHz frequency range when the timing for transmission of the uplink control information fails to satisfy the timing threshold.

20. The method of claim 12, further comprising:
receiving a signal indicating a carrier selection rule for selecting the second carrier, the signal comprising at least one of a radio resource control (RRC) signal, a medium access control (MAC) control element (CE), a downlink control information (DCI), or a combination thereof.

* * * * *